United States Patent [19]

Bell et al.

[11] Patent Number: 4,794,573
[45] Date of Patent: Dec. 27, 1988

[54] PROCESS FOR SEPARATING UPGOING AND DOWNGOING EVENTS ON VERTICAL SEISMIC PROFILES

[75] Inventors: David W. Bell; Vernon D. Cox, both of Ponca City, Okla.

[73] Assignee: Conoco Inc., Ponca City, Okla.

[21] Appl. No.: 154,818

[22] Filed: Feb. 11, 1988

[51] Int. Cl.$^4$ .............................................. G01V 1/40
[52] U.S. Cl. ........................................ 367/57; 364/422
[58] Field of Search ...................... 367/28, 30, 34, 43, 367/46, 47, 57; 364/421, 422

[56] References Cited

U.S. PATENT DOCUMENTS

| | | | |
|---|---|---|---|
| 3,195,676 | 7/1965 | Eisler et al. | 367/57 |
| 3,371,310 | 2/1968 | Silverman | 340/15.5 |
| 4,397,004 | 8/1983 | Bronislaw | 367/27 |
| 4,527,260 | 7/1985 | Horowicz | 367/27 |
| 4,594,662 | 6/1986 | Devaney | 364/422 |
| 4,627,036 | 12/1986 | Wyatt | 367/57 |
| 4,635,238 | 1/1987 | Gallagher et al. | 367/40 |
| 4,646,754 | 3/1987 | Seale | 364/508 |
| 4,706,225 | 11/1987 | Reault | 367/43 |

FOREIGN PATENT DOCUMENTS

| | | |
|---|---|---|
| 1569581 | 9/1977 | United Kingdom . |
| 2029016 | 3/1980 | United Kingdom . |

OTHER PUBLICATIONS

J. J. Raoult, B. Joncheray, and D. Carron, "The Check VSP: A New Vertical Seismic Data Acquisition and Processing Technique", 1984, Expanded Abstracts of S.E.G. Convention.

*Primary Examiner*—Thomas H. Tarcza
*Assistant Examiner*—Ian J. Lobo
*Attorney, Agent, or Firm*—Ronald J. Carlson; Cortlan R. Schupbach; Frank J. Kowalski

[57] ABSTRACT

A process for separating upgoing and downgoing seismic wave events in a vertical seismic profile, and particularly for vertical seismic profiles wherein the seismic energy source is offset from the borehole in which seismic detectors are located in vertical spaced array. The process operates on two detector signals at a time (as $S_1$ and $S_2$) and is based on the concept that waves traveling in opposite directions have spatial derivatives of opposite sign. The derivative is approximated by the difference of the two signals which is time integrated to recover the phase. The resulting integrated difference signal I is then amplitude scale corrected and combined by addition or substraction with a signal $S_0$ representing the sum of the two detector signals to form a succession of filtered signals which, when recorded in alignment in order of detector depths to form a vertical seismic profile preserves either the upgoing or the downgoing seismic events.

10 Claims, 6 Drawing Sheets

PROCESS FOR SEPARATING UPGOING AND DOWNGOING EVENTS ON VERTICAL SEISMIC PROFILES

FIELD OF THE INVENTION

This invention relates to a method of seismic surveying by the vertical seismic profile technique in which seismic wave detectors located in a well bore at different depths detect acoustic waves emanating from a seismic energy source located at or near the earth surface and generate representative electrical signals in response thereto which are recorded in aligned array in order of detector depths, and more particularly to a method for the processing of seismic data signals for separating the downgoing wave events from the upgoing wave events on a vertical seismic profile.

BACKGROUND OF THE INVENTION

Seismic surveying typically involves the use of a source of seismic energy and an array of seismic detectors strategically positioned for its reception. The source of seismic energy can be an apparatus capable of delivering a series of impacts or mechanical vibrations to the surface of the earth, the detonation of a high explosive charge near the earth surface, or other means capable of generating seismic wave energy. The resulting acoustic waves generated in the earth, including those which are reflected from earth strata interfaces, are detected by seismic detectors which transduce the acoustic waves into representative electrical signals. From these electrical signals, informational data may be deduced concerning the structure of earth's substrata.

In vertical seismic profiling, the seismic detectors are positioned at different depths in a borehole, such as a well bore, and the signals from the detectors in response to reception of energy from a seismic energy source are recorded and grouped in alignment in a single display in the order of detector depth. From this display, coherences between the signal traces may be noted which may be analyzed and interpreted to provide information regarding the geologic substructure. However, because of the multiplicity of components comprised in the seismic energy received by a detector and its representative electrical signal, analysis of the signals is oftentimes exceedingly difficult. Such components will typically include a downgoing component representing the directly arriving wave field propagated from the energy source, other downgoing components from seismic energy which have undergone multiple reflections in geologic strata above the detector, upgoing components from seismic energy reflected from interfaces of geologic strata or structures located below the detector, and spurious waves of various kinds.

Heretofore, a number of field-operating and data processing techniques have been devised to accentuate the upgoing components in the detector signals and at the same time minimize the interfering effects of the downgoing components since it is the upgoing components and their transit times representative of reflections from substrata interfaces which provide most useful information and are of primary concern. Most of the current techniques for separating the opposite directions of seismic wave travel in the detector signals assume that time shifts which align the first breaks in the signal traces can also be used to align the desired upgoing seismic wave events. However, this assumption is strictly true only where the upgoing events are derived from horizontal reflectors and the detector signals are from detectors located in a vertical borehole with zero source offset, i.e., the seismic source is located as close to the borehole as possible rather than being offset therefrom. In particular, the current techniques are of limited effectiveness in compensating for "dipping" reflectors and in offset vertical seismic profiling used to identify geologic substructures, such as faults or salt domes located a distance from the well bore. Also, the multichannel "dip" filters in current use generally require many more than two detector signals from which to extract desired information.

The new filtering process described herein does not require preprocessing to align seismic events in seismic signal traces and is applicable to a wide range of geometries, including vertical seismic profiling applications wherein the seismic source is offset from the well bore. It also makes possible, by means of two-trace filtering, to reduce the number of receiver depth levels required in the acquisition of a vertical seismic profile, and therefore a reduction in acquisition costs.

SUMMARY OF THE INVENTION

The invention relates to a method of seismic surveying by the vertical seismic profile technique which seismic detectors located in a well bore at different depths detect seismic wave energy emanating from a seismic energy source located at or near the earth surface and generate representative electrical signals in response thereto, which signals are recorded in order of detector depths in a vertical seismic profile array and processed for separating the upgoing seismic wave events from the downgoing seismic wave events. The process includes the steps of combining a pair of detector signals from adjacent levels in the well bore to form a sum signal, subtracting the signal of the lower detector of the pair from the signal of the other to form a difference signal, integrating the difference signal to form an integral signal, calculating and applying an amplitude scale correction to the integral signal to approximate arrival times appropriate for a detector depth midway between the detector pair, and subtracting the amplitude corrected integral trace from the sum trace to thereby increase the amplitudes of the seismic events which are upwardly traveling as they arrive at the detectors and attenuate the seismic events which are downwardly traveling as they arrive at the detectors. The process steps are successively applied two-by-two to all the signals in a vertical seismic profile to provide a modified vertical seismic profile wherein the upgoing events are enhanced relative to the downgoing events. In an alternate modification of the process which preserves the downgoing events, the time corrected signal is added to the sum signal rather than subtracted therefrom.

DESCRIPTION OF A PREFERRED EMBODIMENT

Figure 1:
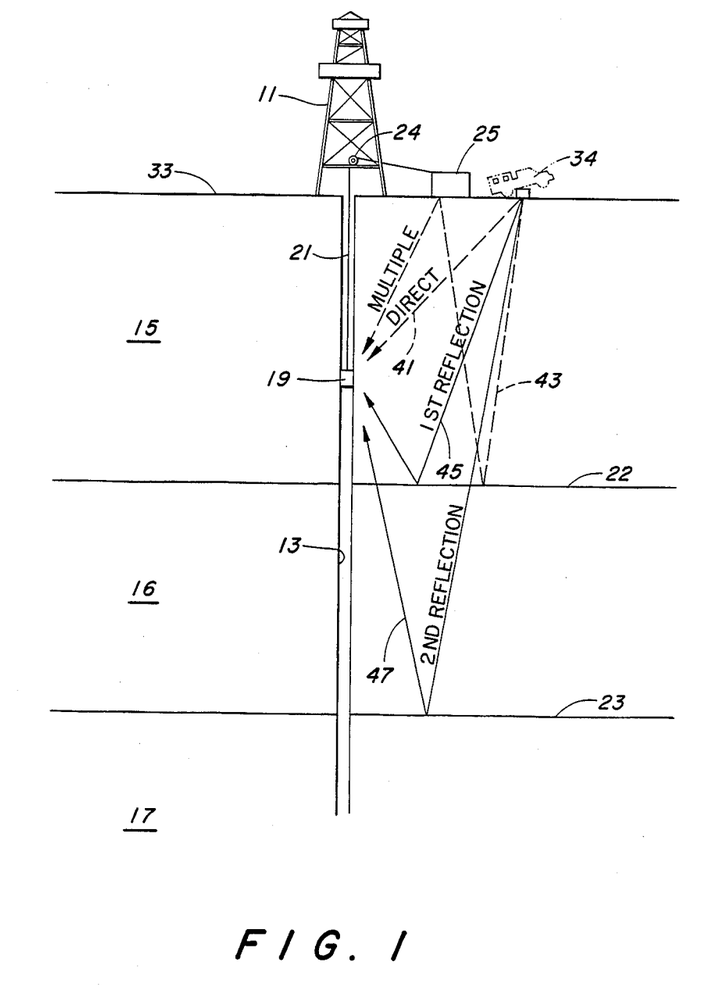
FIG. 1 is a diagrammatic illustration of an earth cross-section penetrated by a well bore and the wave path geometry of seismic waves emanating from a seismic energy source at the earth surface and received by a seismic detector located at a specified depth in the well bore.

Referring to the drawings in greater detail, FIG. 1 illustrates schematically a typical arrangement of apparatus for conducting seismic operations for the acquisition of a vertical seismic profile. A drilling rig 11 is shown in position over a well bore 13 which has been drilled in earth formations 15,16,17. The well bore 13 may be of any specified depth but typically extends to a depth of several thousand feet. A seismic wave transducer or detector 19, sometimes called a geophone, is suspended on a conductor cable 21 in the well bore 13 at a predetermined depth above the interfaces 22,23 of the earth strata 15,16 and 16,17 respectively. The cable 21 which is wound about a reel 24 mounted on the drilling rig 11 or located elsewhere on the earth surface near the well bore 13, allows the transmission of electrical signals produced by the detector 19 to surface equipment 25 for recording and processing. Such equipment typically includes a means (not shown) for providing a precise indication of the depth of the detector 19.

Also shown in FIG. 1 is a seismic wave source 34 located on the earth surface 33 and offset from the well bore 13. The seismic wave source is depicted in FIG. 1 as a weight-dropper 34 which is capable of dropping a weight to deliver a series of impacts to the earth, although it is to be understood, that various other seismic wave generating means, such as a vibrator or explosive charge, could substitute therefor.

In operation, seismic waves are generated by an impact delivered by the weight-dropper 34 on the earth surface 33. These waves are propagated in the earth formations below and detected by the detector 19 which is fastened against the wall of the well bore 13 by an anchoring element (not shown) in a manner providing contact between the detector and wall of the well bore which is suitable for the reception of seismic wave energy. Such an anchoring element is shown in U.S. Pat. No. 4,397,004. In response to the detection of seismic wave energy, the geophone 19 generates an electrical signal representative of the seismic waves impinging thereon and this signal is transmitted via the conductor cable 21 to a magnetic recorder included in the surface equipment 25. While only a single detector 19 is shown in FIG. 1, it is to be understood that a plurality of such detectors may be suspended on the cable 21 in vertically spaced orientation in contact with the wall of the well bore and their signals transmitted via multiple conductors of the cable 21 to the recording equipment which may be any conventional multitrace recorded suitable for recording the individual geophone output signals in reproducible form.

It is to be noted from observation in FIG. 1 of the ray paths of seismic energy emanating from the source 31, that some of the seismic wave energy travels downwardly and directly to the detector 19 as indicated by the ray path 41 and is normally the first seismic event to be detected by the detector 19. However, there may be other seismic events which are downwardly traveling as they impinge on the detector 19. One such, as indicated by the ray path 43, may be a multiply reflected wave representing a portion of the seismic energy which strikes the geologic interface 22 and is reflected thereby to reverberate between the interface 22 and the earth surface 33. In addition, some of the seismic wave energy which is reflected by the interface 22 and illustrated by the ray path 45 is upwardly traveling as it impinges on the detector 19 and is the first upwardly traveling seismic event to be detected by detector 19.

However, the downwardly traveling seismic wave energy which strikes the interface 22 is not totally reflected therefrom and some of the seismic wave energy continues downwardly to be reflected by other geologic interfaces below the interface 22, such as the interface 23. A second reflection of seismic wave energy as indicated by the ray path 47 is upwardly traveling as it impinges on the detector 19 and is the second upwardly traveling event to be detected. There may, of course, be several more of such upwardly traveling seismic waves representing reflections from lower geologic strata which are not shown in FIG. 1 for clarity of explanation.

Figure 2:
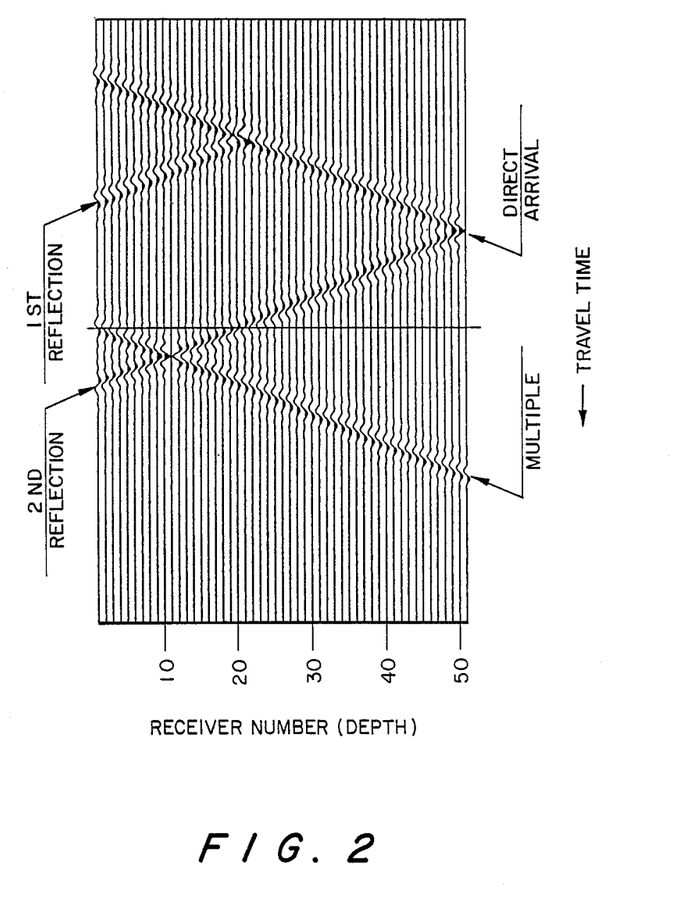
FIG. 2 is a vertical seismic profile display of detector signals representative of seismic waves received over time by seismic detectors positioned at successively greater depths in a well bore wherein the detector signals are arranged in horizontal alignment in correspondence with the depth of the detectors and the differing appearances of directly arriving waves at the detectors and wave reflections from interfaces of geologic strata located below the detectors are illustrated.

FIG. 2 is an illustration in a synthetic vertical seismic profile display of receiver depth and travel time showing how the seismic events associated with the ray paths in FIG. 1 would appear in a vertical seismic profile. Each of the vertically oriented traces in the profile corresponds to the recorded electrical signal transmitted by a single detector in the well bore and the total 51 traces are recorded signals from a detector at 51 successively lower depths in the well. However, it is also to be understood, that the vertical seismic profile could be acquired with only a single generation of seismic energy from the energy source using 51 detectors in the well bore or by a series of impacts of the weight dropper wherein one or more detectors are successively positioned at greater depths in the well bore to receive the energy.

In the vertical seismic profile of FIG. 2, the downgoing events on the profile are the directly arriving wave from the seismic energy source and a multiple reflected wave reverberating in the first layer of earth below the energy source whereas the upgoing events are the reflections of seismic energy from two interfaces of earth strata. These events appear on a trace as a sudden increase or a peak in signal amplitude and in a vertical seismic profile these amplitude changes in the traces of the profile are disposed as a dipping feature of the profile. It will be noted that the amplitude changes representing the downgoing arriving waves in the several traces appear in alignments which are dipped oppositely to the alignments of the signal amplitude changes representing the arrival of upgoing reflections which phenomenon is typical of vertical seismic profiles wherein opposite directions of seismic wave travel within the earth lead to opposite dips on the display.

Since exploration by vertical seismic profiling techniques is concerned with detection of the reflecting horizons of the different earth strata, the detection and analysis of the upgoing waves is the primary concern. It is therefore necessary, in order to improve the signal-to-noise ratio and to better distinguish the upgoing waves, to filter the collected signals. It is therefore desirable that the filtering process operates to suppress the downgoing events in the vertical seismic profile.

The filtering process of this invention will be hereinafter described by consideration of traces 10 and 11 (produced by Receivers 10 and 11, respectively) in the vertical seismic profile of FIG. 2. These traces have been selected so that the undesired multiple and the second reflection interfere with one another in that they add constructively on the first trace and cancel on the second. Despite such interference, it will nevertheless be shown that the process of this invention can correctly separate the two events.

Figure 3:
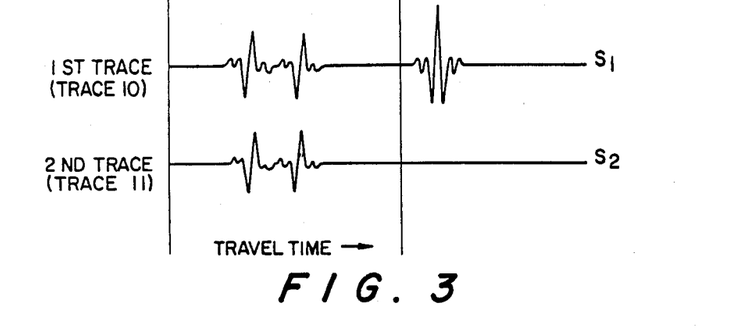
FIG. 3 is a reproduction of signal traces 10 and 11 in the vertical seismic profile of FIG. 2 where these traces are each displayed in horizontal orientation and aligned one below the other.

In FIG. 3, the traces 10 and 11 of FIG. 2 are reproduced exactly but are plotted in horizontal orientation for purposes of explanation. From observation of FIG. 3 it will be noted that the wavelet shape for the first two events on each trace is a trough followed by a peak. The second two events, corresponding to the second reflection and the multiple in the vertical seismic profile of FIG. 2, interfere with one another to construct a different wave shape (trough-peak-trough) in the first trace (trace 10) and to perfectly cancel one another on the second trace (trace 11).

Figure 4:
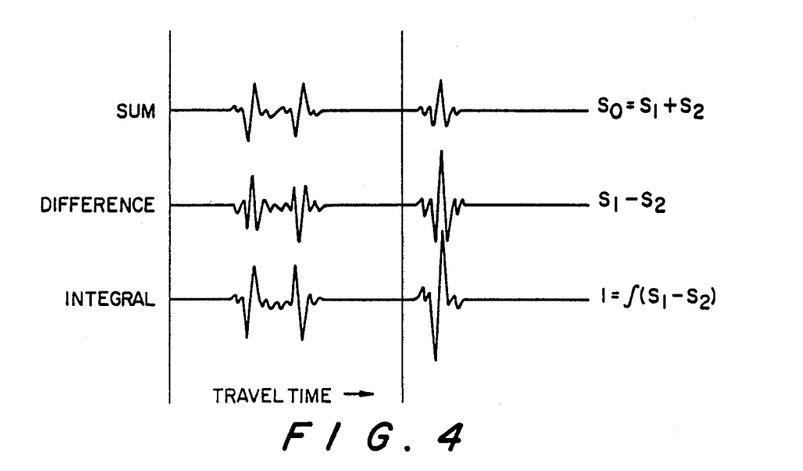
FIG. 4 is a display, similar to FIG. 3, of sum and difference signal traces representing the sum and difference of the pair of signal traces 10 and 11 and a third signal trace, an integral trace, representing an integration of the difference signal trace.

The first step in the process is to form two new signals from the sum and difference of the original traces 10 and 11. These new signals are represented in FIG. 4 by the signal traces $S_o$ and $(S_1-S_2)$. From observation of these traces, the summed or averaged trace $S_o$, with respect to wave shape, looks much like the original traces 10 and 11. However, the difference trace $(S_1-S_2)$ has a different wavelet shape for the events appearing thereon in that each wavelet is approximately 90° phase shifted, and, more important, shows a change in polarity between the upgoing and downgoing events. It is therefore to be noted that the first two events on the summed trace, one desired and the other undesired, look identical whereas on the difference trace, with respect to these same two events, one is upside down relative to the other.

Figure 5:
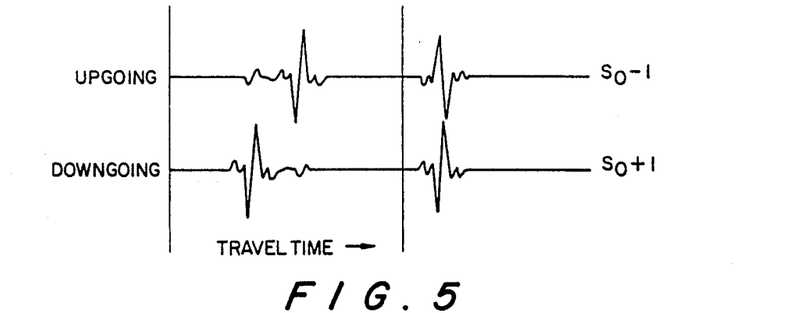
FIG. 5 is a display of a first signal trace resulting from the substraction of the integral trace from the sum trace and a second signal trace resulting from an addition of the integral trace and the sum trace.

The process then requires a wave shape correction which is achieved by the step of integrating the difference signal to obtain an integral thereof, represented in FIG. 4 as the integral trace I. An amplitude scale correction of the integral signal is then performed followed by the step of subtracting the integrated difference signal from the summed signal. The subtracting step in effect doubles the amplitudes of the upgoing events and cancels the downgoing events, as is readily apparent in the signal trace $(S_o-I)$ shown in FIG. 5. On occasion, the arrival of the downgoing events may be of interest and in such case, the downgoing events may be preserved by the step of adding the integrated and summed signals, $S_o$ and I, to obtain the resulting signal trace $(S_o+I)$ shown in FIG. 5. For either of the traces for FIG. 5, the arrival times of the separated events are appropriate for a depth halfway between the receiver pair. Also, the amount of residual unwanted events on the filtered signal traces is a function of the receiver spacing and seismic wavelet.

The filtering process of this invention is ideally suited to processing vertical seismic profiles, but has potential application wherever a dip filter is desired. It can be used whenever desired and undesired events are dipping in opposite directions, or can be shifted so as to appear dipping in opposite directions. For example, a surface wave may be shifted relative to reflection energy in order to suppress the surface wave.

As previously stated, there will normally be a requirement for applying an amplitude scale correction to the integral signal trace before performing the step of subtracting the integral trace I from the sum trace $S_o$. This correction, of course, can be specified exactly if the time separation, as might be available from an acoustic well log or from the vertical seismic profile first breaks, is known. Nevertheless, the scaling can effectively be achieved by power balancing the traces before subtraction.

A procedure whereby a time delay scaling factor can be estimated with appropriate accuracy is herein described.

In the acquisition of a vertical seismic profile, let $S_1$ and $S_2$ be the signals detected at two adjacent levels, level 1 and level 2, in a well bore. Also, let the signal which would have been measured at the midpoint of the adjacent levels be denoted by $S_o$. If T be the time delay of the wave traveling between the midpoint and the levels for acquisition of $S_1$ and $S_2$, then, assuming a constant velocity layer, $$S_o = u(t) + d(t) \tag{1}$$

$$S_1 = u(t-T) + d(t+T) \tag{2}$$

$$S_2 = u(t+T) + d(t-T) \tag{3}$$

where u(t) and d(t) are the upgoing and downgoing wave fields at the midpoint level.

$S_1$ and $S_2$ are then expanded in a Taylor's series wherein, for closely spaced receivers, terms of first order in T are retained to obtain $$S_1 = u - Tu + d + Td \quad (4)$$

$$S_2 = u + Tu + d - Td \quad (5)$$

wherein the dot denotes differentiation with respect to t.

The average of $S_1$ and $S_2$ is therefore $$S = (S_1 + S_2)/2 = u + d \quad (6)$$

The difference of $S_1$ and $S_2$ is $$S_2 - S_1 = 2T\dot{u} - 2T\dot{d} \quad (7)$$

The integral of the difference is $$I = 2T(u - d) \quad (8)$$

In equation (8), the negative coefficient of d is due to the opposite directions of travel of the two wave fields. The factor 2 comes from the definition of T to be the time delay between the midpoint and level 1 or 2, that is, the time delay between level 1 and level 2 is 2T.

Dividing I by $2T_o$, where $T_o$ is some arbitrary constant, and adding the result to S, the following is obtained:

$$\frac{I}{2T_o} + S = \frac{2T(u-d)}{2T_o} + (u + d) \quad (9)$$

$$\text{or } \frac{I}{2T_o} + S = \left(1 + \frac{T}{T_o}\right)u + \left(1 - \frac{T}{T_o}\right)d$$

It is therefore apparent that u and d can be determined from the combination of S and I expressed in equation (9). The downgoing wave field may be eliminated by setting $T_o = T$ to obtain u. Alternatively, the upgoing wave field may be eliminated by setting $T_o = -T$ to obtain d.

T can be determined from the difference in the first arrival times of a wave field at the two detectors, since the difference represents the travel time between the two detectors. This travel time divided by 2 therefore equals T. However, a more flexible and automatic procedure for determining T is outlined below. From equations (6), (7) and (8), the power in S and I is given by $$P_s = P_u + P_d + 2\phi_o(u,d) \quad (10)$$

$$P_I = 4T^2[P_u + P_d - 2\phi_o(u,d)] \quad (11)$$

where $\phi_o(u,d)$ is the zero lag cross-correlation of the upgoing and downgoing wave fields. Since the upgoing and downgoing wave fields at a given time are uncorrelated, $\phi_o(u,d) = 0$. Then, by dividing equation (11) by equation (10), the following is obtained:

$$4T^2 = P_I/P_s \quad (12)$$

Accordingly, T which is readily obtainable from equation (12), provides an estimated value of the time delay between the two levels, which estimate is not based on a single value, but represents an average value of the shifts for the whole trace. This estimated value is therefore a better estimate than can be determined from the first arrivals alone.

It is to be noted, however, that this derived estimated value of T is valid so long as T is small enough that terms higher than first order in the Taylor's series can be neglected. A small enough T means that the receivers are sufficiently close together that T is small compared to the smallest period (associated with the highest frequency) present in the data. If T becomes a large fraction of the smallest period, then a condition similar to "cycle skipping" occurs. That is, when comparing two cosine waves which have a relative time shift, it is impossible to distinguish between waves shifted up greater than half a cycle and down less than half a cycle. Since the process of this invention attempts to detect these relavtive shifts, the process will fail for those wavelengths.

From the foregoing, it is to be concluded that the filtering process herein described yields a resulting signal approximating the signal which would have been recorded midway between the two receivers. In effect, the filter process mixes two traces whereas most multichannel filters mix several traces. This, of course, results in the loss of one trace per group of input traces and also results in a new depth specification. However, since there is normally less level smearing with a two-trace filter, it better preserves faults and steeply dipping events in offset vertical seismic profiling.

Figures 6, 8:
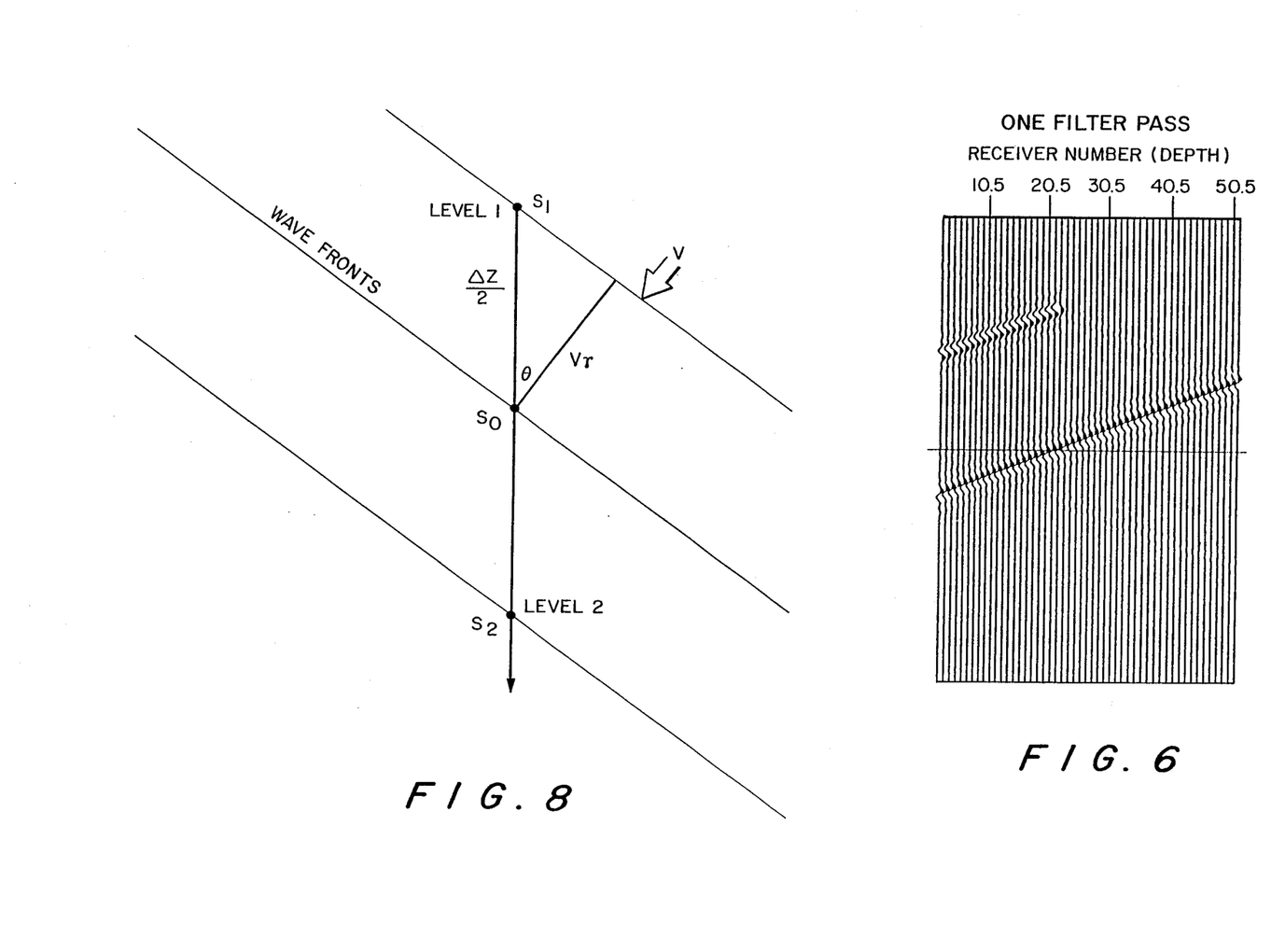
FIG. 6 is a vertical seismic profile derived from the vertical seismic profile of FIG. 2 after the process of the invention has been applied in successive steps, two traces at a time, to all the signal traces in the vertical seismic profile of FIG. 2.
FIG. 8 is a diagrammatic illustration of the ray-path geometry of an incident wave approaching the axis defined by two seismic detectors positioned at two adjacent levels in a well bore.

FIG. 6 shows the results of applying the process of the invention two-by-two to all the traces in the synthetic vertical seismic profile of FIG. 2. It is shown therein that a single pass or application of the process greatly enhances the upgoing events relative to the downgoing events. In effect, the upgoing events are doubled in amplitude and the downgoing events are so attenuated that only a small residual could be noted. A second pass would further improve the separation but normally is not needed unless significant differences in dip occur. For example, if mode converted events are present, one pass would reject the downgoing P-wave (compressional wave) energy and a second pass might be needed to reject the downgoing S-wave (shear wave) energy.

A system for implementation of the filtering method described above is shown in FIG. 7. The detector signals obtained from vertically spaced detectors in a borehole are recorded and stored in a memory 60. The memory 60 is controlled to furnish for processing a pair of detector signals, $S_1$ and $S_2$, corresponding to signals from detectors at adjacent levels. The pair of signals are also delivered to an adder 61 and a subtractor 62 for obtaining sum and difference signals, $S_o$ and $((S_1-S_2)$, respectively. The difference signal is then applied to an integrating circuit 63 which produces an integral signal I. The integral signal I is then delivered to a calculator 65 which applies an amplitude scale correction to the integral signal I as determined from the equation (12) above.

Figure 7:
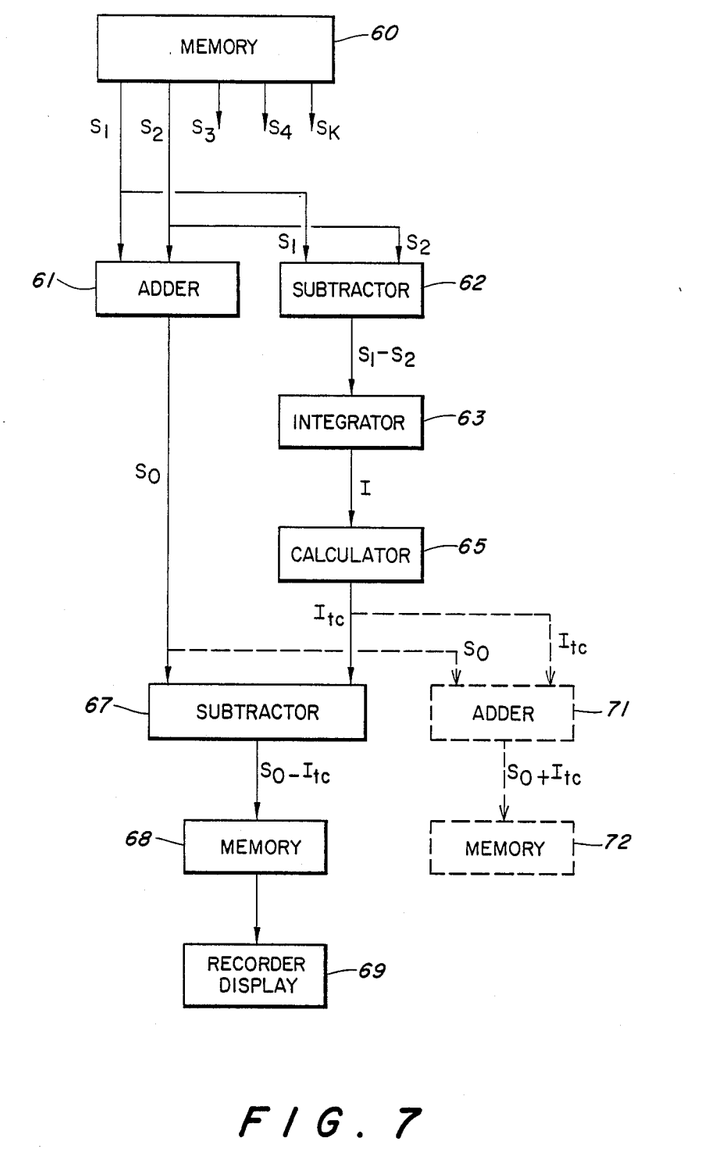
FIG. 7 is a block diagram of a system according to the invention for the filtering of detector signals obtained in the acquisition of a vertical seismic profile.

The amplitude-corrected integral signal and the sum signal are delivered to a subtractor circuit 67 wherein the amplitude-corrected integral signal is substracted from the sum signal $S_o$ to provide an output signal $S_o - I_{tc}$ wherein the amplitudes of upgoing seismic events are significantly enhanced and the downgoing events are significantly attenuated. The output signal from the subtractor 67 is then recorded in memory 68 from which it may be applied to a recorder display device 69 for display in a vertical seismic profile.

Alternatively, or in conjunction therewith, the sum signal $S_o$ and the amplitude-corrected integral signal may also be delivered to an adder 71 wherein they are added to preserve the downgoing events, and the resulting summation signal stored in a memory 72.

It is also to be understood that the system is adapted to process all the signals in a vertical seismic profile such that the process is repeatedly applied two-by-two to all the signal traces of the profile to obtain an improved vertical seismic profile in accordance with the invention. The system can be used with either analog or digital means of data processing.

An important consideration is the response of the filter to more than one dip. Accordingly, it will herein be shown that the time scale factor which is chosen to eliminate a particular downgoing event also attenuates similar downgoing events and enhances all upgoing events. In this respect, it is to be noted that the scaling factor T can be related to the angle of approach of the incident wave. Referring to FIG. 8, which diagrammatically illustrates the approach to a receiver of an incident wave arriving at an angle to the axis line defined by a pair of aligned receivers, it will be seen that $$2T = \Delta Z \cos(\theta)/V \tag{13}$$

where $\Delta Z$ is the distance between two levels, V is the velocity of the wave in the region of the two levels, and $\theta$ is the angle between the direction of the wave travel and the axis defined by the receiver pair at two adjacent levels. A wave traveling straight down the axis corresponds to $\theta = 0°$.

Assuming a scaling factor $2 T_o$ is chosen to reject a downgoing wave of $T_o$ such that $2 T_o = \Delta Z \cos(\theta_o)/V$, then if the upgoing wave has $2 T = \Delta Z \cos(\theta)/V$, the response curve for the filter as obtained from equation (9) is given by $$R(\theta, \theta_o) = 1 - T/T_o = 1 - \cos(\theta)/\cos(\theta_o) \tag{14}$$

Figure 9:
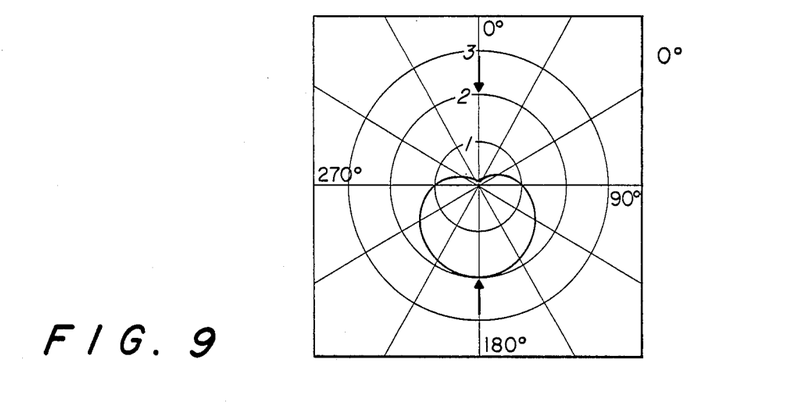
FIG. 9 is a graph in polar form representing the directional amplitude response, $R(\theta, \theta_o)$, for the filtering process of the invention as a function of incident angle wherein the directly arriving wave arrives at an incident angle of 0° with respect to the axis defined by the pair of receivers in FIG. 7.
Figure 10:
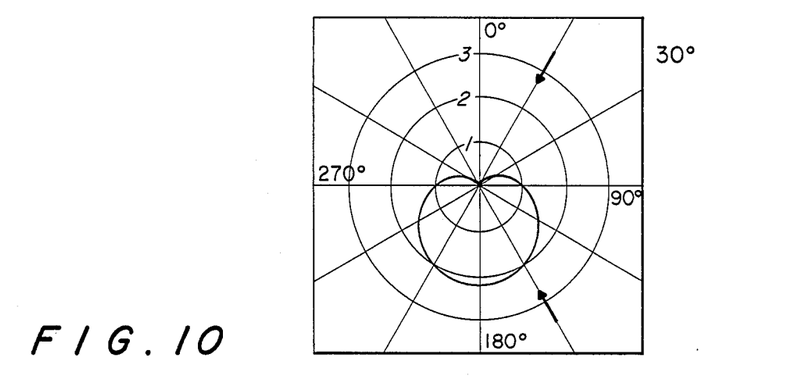
FIG. 10 is a graph in polar form representing the directional amplitude response, $R(\theta, \theta_o)$, for the filtering process of the invention as a function of incident angle wherein the directly arriving wave arrives at an incident angle of 30° with respect to the axis defined by the pair of receivers in FIG. 7.
Figure 11:
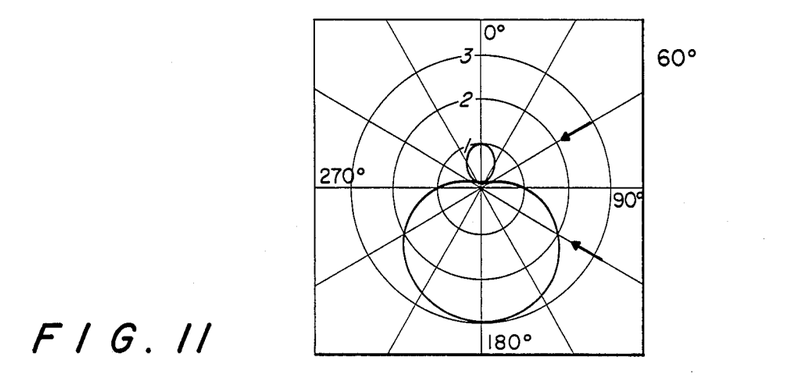
FIG. 11 is a graph in polar form representing the directional amplitude response, $R(\theta, \theta_o)$, for the filtering process of the invention as a function of incident angle wherein the directly arriving wave arrives at an incident angle of 60° with respect to the axis defined by the pair of receivers in FIG. 7.

The graph of equation (14) is shown in FIG. 9 for an incident wave where $\theta_o = 0$ and in FIGS. 10 and 11 where $\theta_o = 30°$ and $60°$, respectively. In these curves, the distance from the origin corresponds to $R(\theta, \theta_o)$ and the beam pattern polar plots indicate amplitude by circles of successively greater radius as a function of incident angle indicated by radial lines. In each of the plots, the vertical axis corresponds to well bore geophone alignment and the arrows indicate wave direction used for time scaling. In each of FIGS. 9, 10 and 11, the curve for $R(\theta, \theta_o)$ traces the filter response for seismic wave events arriving from all other directions.

It will be noted from FIG. 9, wherein $\theta_o = 0°$, that a wave approaching the axis of the receiver pair at an angle of 0° as represented by the upper arrow is cancelled exactly, with the response curve depicting an amplitude of zero. Also, it is to be noted that a wave, such as a reflected wave, which approaches the receiver pair at an angle of 180° as represented by the lower arrow is enhanced by a factor of 2. Similarly, a wave event which approaches the receiver pair at an angle of 90°, i.e. broadside to the axis of the receiver pair, arrives at both receivers at the same time and is passed exactly, the amplitude being represented equal to 1.

Referring to FIGS. 10 and 11, the upper arrows might typically represent the direct arrivals of seismic waves from an offset seismic wave source and the lower arrows, a reflected wave from a horizontal substratum. It will be observed that the direction of exact cancellation is such that it is always at $\theta_o$ and the magnitude of the response curve for a wave arriving at 180°, $R(180° - \theta_o, \theta_o)$, is always 2. From observation of each of the curves of FIGS. 9, 10 and 11, it will be noted that waves which approach the receiver array from below are always enhanced (R>1), while waves which approach the array in a wide band around 0° are always reduced (R<1).

It is to be noted, therefore, that the two-trace filter of this invention has a good rejection response over a wide range of dip angles. It is particularly effective when the number of traces is small and for dip moveouts that are not linear, as in offset vertical seismic profiling. However, if several different dips are to be rejected, a second pass of the filter will prove advantageous.

Applications have shown the two-trace directional filtering process of the invention to be tolerant of poor signal-to-noise ratios and will not produce artificial alignments like some harshly applied filters. However, since the process will enhance low frequencies relative to highs, it is generally advisable that a band-pass filter and/or spectral balancing operator be subsequently applied. Also, since in the processing of vertical seismic profiles, the invention does not require first break time picks to accomplish separation of the upgoing and downgoing events, the process can be applied at an earlier stage than other dip filters.

It is not a requirement of the invention that receiver spacing must be uniform, although the spacing must be small enough not to alias frequencies of interest. If the spacing selected is too large compared to a wavelength of seismic energy, then wavelet distortion will result which is true, in general, for all dip filters. While the filter process of the present invention is useful for any wavelengths which are unaliased, the filter process is preferably used with about half the normal range of spacing, i.e., best results are achieved with spacings less than a quarter of the shortest wavelength. Successful applications of the process have been achieved with vertical seismic profiles wherein the level spacings are between 10 and 125 feet. Accordingly, the technique can be used effectively on the majority of existing vertical seismic profile data sets.

The technique of the invention also allows for large depth separations between closely spaced pairs of receiver locations and consequently a significant reduction in the total number of detector levels as compared to most existing techniques which require a small depth spacing between all detector levels and oftentimes produce more levels than are needed. The larger number of detecting levels are normally associated with greater costs in service charges and rig time. Furthermore, since it is possible to practice the invention using a ten foot detector level spacing, it also becomes possible to place the receiver pair in the same tool, thereby allowing even more acquisition flexibility and further possibilities in reducing costs.

From the foregoing description of the invention, it is to be appreciated that the two-trace filter process of this invention has far more general applications than existing techniques. There are many potential advantages of the two-trace filter which lie in the less restrictive assumptions imposed on acquisition geometry and structural complexity of the subsurface geology, such that potential applications are to be found wherever a dip filter is desired.

It is also to be understood that alternative techniques in performing the various method steps of the invention may be used as are apparent to those skilled in the art, without departing from the scope and spirit of the invention as defined in the appended claims.

We claim:

1. A method of seismic geophysical surveying wherein a seismic energy source positioned at or near the earth surface is adapted to generate seismic wave energy which is detectable by seismic detectors in vertical spaced array in a borehole and the electrical signals generated by the seismic detectors in response thereto are processed for discriminating the seismic events which are upward traveling as they arrive at the detectors from those which are downward traveling as they arrive at the detectors, said method comprising the steps of:
   (a) generating seismic waves in the earth at a given location,
   (b) detecting the resultant seismic waves at a plurality of vertically spaced levels in a borehole penetrating earth formations below the energy source and generating representative electrical signals in response thereto by means of detector transducers positioned in the borehole at each said level,
   (c) combining a pair of detector signals from a pair of detectors at adjacent levels in the borehole to form a sum signal,
   (d) subtracting the signal from the lower detector of the pair from the signal of the other detector of the pair to form a difference signal,
   (e) integrating the difference signal to form an integral signal,
   (f) applying an estimated amplitude scale correction to the integral signal to form a resulting signal which is an approximate representation of a detector signal from a detector located midway between said pair of detectors, and
   (g) subtracting the amplitude corrected signal from said sum signal to form a modified filtered signal wherein the amplitudes of the seismic wave events which are upwardly traveling as they arrive at the detectors are increased and the seismic wave events which are downwardly traveling as they arrive at the detectors are attenuated.

2. A method as recited in claim 1 wherein the seismic energy source is offset from the borehole.

3. A method as recited in claim 1 wherein the seismic wave energy generated by the seismic energy source is detected by vertically spaced pairs of seismic detectors located at successively lower depths in the borehole and the steps of the method are successively applied to the signals of each said pair.

4. A method as recited in claim 1 wherein the electrical signals from the plurality of detectors are first recorded in aligned array in order of detector depth to form a vertical seismic profile prior to the step of combining a pair of detector signals.

5. A method as recited in claim 3 wherein the filtered signals from the processed pairs of detector signals are recorded in the order of their successively greater depths to form a filtered vertical seismic profile.

6. A method of seismic geophysical surveying wherein a seismic energy source positioned at or near the earth surface is adapted to generate seismic wave energy which is detectable by seismic detectors in vertical spaced array in a borehole and the electrical signals generated by the seismic detectors in response thereto are processed for discriminating the seismic events which are upward traveling as they arrive at the detectors from those which are downward traveling as they arrive at the detectors, said method comprising the steps of:
   (a) generating seismic waves in the earth at a given location,
   (b) detecting the resultant seismic waves at a plurality of vertically spaced levels in a borehole penetrating earth formations below the energy source and generating representative electrical signals in response thereto by means of detector transducers positioned in the borehole at each said level,
   (c) combining a pair of detector signals from a pair of detectors at adjacent levels in the borehole to form a sum signal,
   (d) subtracting the signal from the lower detector of the pair from the signal of the other detector of the pair to form a difference signal,
   (e) integrating the difference signal to form an integral signal,
   (f) applying an estimated amplitude scale correction to the integral signal to form a resulting signal which is an approximate representation of a detector signal from a detector located midway between said pair of detectors, and
   (g) adding the amplitude corrected signal to said sum signal to form a filtered signal wherein the seismic wave events which are downwardly traveling as they arrive at the detectors are preserved.

7. A method as recited in claim 6 wherein the seismic energy source is offset from the borehole.

8. A method as recited in claim 6 wherein the seismic wave energy generated by the seismic energy source is detected by vertically spaced pairs of seismic detectors located at successively lower depths in the borehole and the steps of the method are successively applied to the signals of each said pair.

9. A method as recited in claim 8 wherein the filtered signals from said successive pairs of detector signals are recorded in the order of their successively greater depths to form a filtered vertical seismic profile.

10. In a method of seismic geophysical exploration by the vertical seismic profile technique wherein the seismic energy generated by a seismic energy source is detected by seismic detectors in vertically spaced array in a borehole and the representative electrical signals generated by the detectors in response thereto are recorded in aligned array in the order of detector depth to form a vertical seismic profile wherein seismic events which are upwardly traveling as they arrive at the detectors are separated from downwardly traveling events as they arrive at the detectors, said method comprising the steps of:
   (a) combining a pair of the recorded detector signals from a pair of detectors at adjacent levels in the borehole to form a sum signal,
   (b) subtracting the signal from the lower detector of the pair from the signal of the other detector of the pair to form a difference signal,
   (c) integrating the difference signal to form an integral signal,
   (d) calculating an estimated amplitude scale correction for application to the integral signal to form a resulting signal representative of a signal from a detector located between said pair of detectors,
   (e) subtracting the amplitude corrected signal from said sum signal to form a filtered signal wherein the upwardly traveling seismic wave events arriving at the detectors are discriminated from the downwardly traveling seismic wave events,
   (f) repeating each of the foregoing steps to successive pairs of signals for all the signals of the vertical seismic profile, and
   (g) recording the successively formed filtered signals in a vertical seismic profile.

* * * * *